United States Patent
Chuang et al.

(10) Patent No.: US 8,532,495 B2
(45) Date of Patent: Sep. 10, 2013

(54) METHOD FOR ENERGY EFFICIENT PULSING OPERATION OF TRANSCEIVERS OF A NETWORKED DEVICE

(75) Inventors: Keng Hua Chuang, Singapore (SG); Daniel Joseph Dove, Colfax, CA (US); Mark Gravel, Roseville, CA (US); Yee Hong Tan, Singapore (SG); Lawrence Lee Chee How, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 12/842,282

(22) Filed: Jul. 23, 2010

(65) Prior Publication Data
US 2012/0020675 A1    Jan. 26, 2012

(51) Int. Cl.
*H04B 10/00*    (2013.01)

(52) U.S. Cl.
USPC .................................. 398/151; 381/1; 381/156

(58) Field of Classification Search
USPC ............................................... 398/1, 151, 156
See application file for complete search history.

(56) References Cited

U.S. PATENT DOCUMENTS

| 6,359,713 | B1 * | 3/2002 | DeCusatis et al. | 398/178 |
|---|---|---|---|---|
| 2009/0067835 | A1 * | 3/2009 | Chen | 398/45 |
| 2011/0293274 | A1 * | 12/2011 | Sakamoto et al. | 398/58 |
| 2012/0076492 | A1 * | 3/2012 | Saleh et al. | 398/25 |
| 2012/0106957 | A1 * | 5/2012 | Willeke et al. | 398/58 |

\* cited by examiner

*Primary Examiner* — Nathan Curs

(57) ABSTRACT

A method performed by a networked device for energy efficient operation of an optical transceiver of the networked device is described herein. It is determined whether a port control of the networked device is enabled to operate in an energy efficient state. Where the port control is enabled to operate in the energy efficient state and an absence of a valid receive energy from a link partner is determined, a laser transmitter of the optical transceiver is pulsed by asserting and de-asserting a control signal.

11 Claims, 5 Drawing Sheets

METHOD FOR ENERGY EFFICIENT PULSING OPERATION OF TRANSCEIVERS OF A NETWORKED DEVICE

I. BACKGROUND

It is common in conventional computing environments to connect a plurality of computing systems and devices through a communication medium often referred to as a network. In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links.

As the demand for networking resources grows and more network devices are deployed in the network computing environment, the power consumption of the networked devices may be significant. In the context of a datacenter or other large-scale network computing environments, thousands of networked devices may be deployed. The amount of power consumed by the network devices and the monetary cost associated therewith may be considerable.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Figure 1:
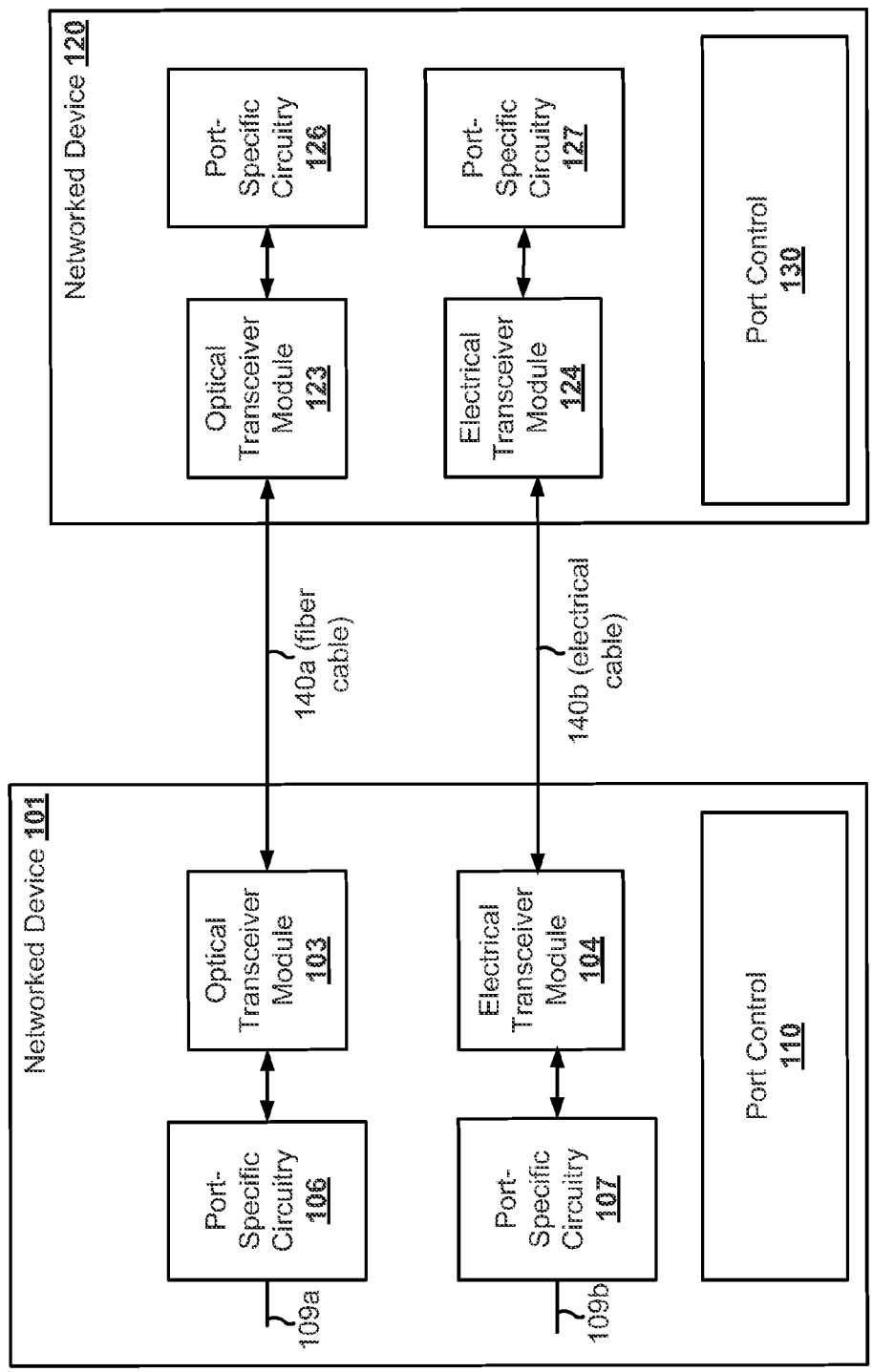
FIG. 1 is topological block diagram of a network system in accordance with an embodiment of the invention.

Internet traffic is typically forwarded from a source to a destination through a series of networked devices connected by network cables. The networked devices represent devices such as routers, switches, personal computers, printers, etc. The network cables, such as Ethernet electrical or fiber optic cables, are physical media that connect a pair of networked devices. As used herein, the term Ethernet is interpreted to be read broadly and to encompass local area networks and the protocols and standards used in local area networks.

To accommodate increasing volumes of network traffic, the Internet is relying more and more on the vast bandwidth of optical fiber media. A physical port of a networked device is a connection point for a network cable, such as a fiber optic cable. To establish a communication link between two networked devices through the network cable, a link partner may be detected, for example using link discovery signaling (LDS).

Typically, before a communication link is established, activity on the physical port is assessed. For example, a signal (e.g., a module absent signal) from an optical transceiver module of a networked device may indicate that a module, such as a fiber-optic cable connector, is physically present in the receptacle of the transceiver module. If present, a laser in the optical transceiver module may be enabled to transmit an optical signal through the network cable to the link partner. The link partner may detect the valid optical signal and a communication link between the two networked devices may be established.

The laser in the optical transceiver module may continue to transmit the optical signal and thereby consume power even where there is no valid laser signal from a device on the opposing end of the network cable. For example, where a module is determined to be present in the receptacle of a networked device (e.g., a module absent signal is de-asserted), the laser may continue to consume power by driving an optical signal even when a signal (e.g., receive loss of signal) on the receive side of the optical transceiver module indicates that the received signal strength, if any, is below a specified range.

The power consumption of the laser in the optical transceiver module may be reduced when there is no valid laser signal. Hardware, software, and/or firmware within the networked device may be used to execute an energy efficient network control policy.

A method for energy efficient operation of an optical transceiver of a networked device is described herein. It is determined whether a port control of the networked device is enabled to operate in an energy efficient state. Where the port control is enabled to operate in the energy efficient state and an absence of a valid receive energy from a link partner is determined, a laser transmitter of the optical transceiver is pulsed by asserting and de-asserting a control signal. An operating state of the laser transmitter is configured in response to the control signal. In one embodiment, the control signal is a transmit disable signal or other signal that controls the operating state of the laser transmitter. In another embodiment, the control signal is a port-specific control disable signal or other signal that controls the operating state of port-specific circuitry (e.g., PHY, Media Access Controller, etc.)

FIG. 1 is topological block diagram of a network system 100 in accordance with an embodiment of the invention. Network system 100 includes networked device 101, networked device 120, and network cables 140a-140b. The networked devices 101 and 120 may be link partners that communicate via an Ethernet link through one or more of network cables 140a and 140b. Network cable 140a is an optical fiber cable, which may be a single mode fiber or a multi-mode fiber. Network cable 140b is a copper cable, including copper mediums such as Direct Attached Cable (DAC), Shielded Twisted Pair (STP), Unshielded Twisted Pair (UTP), Cat 3, Cat 5, Cat 5e, Cat 6, Cat6a, Cat 7, Cat 7a, and/or other variants. Additionally, copper media technologies such as InfiniBand, Ribbon and backplane may be used. In one embodiment, one or both of networked devices 101 and 120 may be operable to comply with one or more standards based on IEEE 802.3.

Networked device 101 is configured to transmit and receive data packets. For example, networked device 101 may be a server, end station, or other computer. Networked device 101 is operatively coupled to networked device 120.

Networked device 101 includes a port-specific circuitry 106, a port-specific circuitry 107, an optical transceiver module 103, an electrical transceiver module 104, and a port control logic 110.

As used herein, a port-specific circuitry may include a PHY, a Media Access Controller (MAC), buffer memory, and/or other logic or circuitry. Port-specific circuitry 106 and port-specific circuitry 107 are configured to enable communication, for example transmission and reception of data between networked device 101 and networked device 120 via network cables 140*a-b*. Port-specific circuitry 106 is operatively coupled to optical transceiver module 103 and one or more MAC-PHY interfaces via connection line 109*a*. One or more of MAC-PHY interfaces may be an Attachment Unit Interface (AUI), Media Independent Interface (MII), Serial Media Independent Interface (SMII), Serial Gigabit Media Independent Interface (SGMII), Gigabit Media Independent Interface (GMII), Reduced Media Independent Interface (RMII), Reduced Gigabit Media Independent Interface (RGMII), Quad Serial Media Independent Interface (QSMII), 10 Gigabit Media Independent Interface (XGMII), 10 Gigabit Attachment Unit Interface (XAUI), or 10 Gigabit Serial Interface (XFI). Port-specific circuitry 107 is operatively coupled to electrical transceiver module 104 and one or more MAC-PHY interfaces via connection line 109*b*.

In one embodiment, port-specific circuitry 106 and 107 may provide layer one (physical layer) operability and/or functionality that enables communication with another (e.g., remote) port-specific circuitry. Port-specific circuitry 106 and 107 may comprise suitable logic, circuitry, and/or code that may enable operability and/or functionality of physical layer specifications. Specifically, the suitable logic, circuitry, and/or code may enable generating the appropriate link discovery signaling used for establishing communication with a remote PHY device on a remote networked device, such as networked device 120.

Optical transceiver module 103 may be a pluggable transceiver module or may be integrated within networked device 101. Various form factors for the pluggable optical transceiver module 103 include SFP, SFP+, XENPAK, X2, XFP, QSFP, and XPAK modules. Optical transceiver module 103 is configured to operate at one or more standard rates such as 10 Mbps, 100 Mbps, 1 Gbps, and 10 Gbps, potentially standardized rates such as 40 Gbps and 100 Gbps, and/or non-standardized rates.

Port-specific circuitry 107 and electrical transceiver module 104 are configured to enable communication, for example transmission and reception of data between networked device 101 and networked device 120 via network cable 140*b*.

Port control 110 is configured to enforce a policy that places restrictions on one or more ports of networked device 101. The policy may be applied to specific ports which include an optical transceiver module. Specifically, the policy may maximize energy efficiency of one or more optical transceivers, for example, by modifying an operating state of the optical transceiver. Moreover, the policy may also be applied to maximize energy efficiency of port-specific circuitry.

Networked device 120 is configured to transmit and receive data packets. For example, networked device 120 may be a switch, router, or other network device. Networked device 120 is operatively coupled to networked device 101.

Networked device 120 includes a port-specific circuitry 126, a port-specific circuitry 127, an optical transceiver module 123, an electrical transceiver module 124, and a port control logic 130.

Port-specific circuitry 126 is configured to enable communication, for example transmission and reception of data between networked device 101 and networked device 120 via network cable 140*a*. Port-specific circuitry 126 is operatively coupled to optical transceiver module 123.

Optical transceiver module 123 may be a pluggable transceiver module or may be integrated within the networked device 101. Various form factors as previously described may be used for the pluggable optical transceiver module 123.

Port-specific circuitry 127 and electrical transceiver module 124 are configured to enable communication, for example transmission and reception of data between networked device 101 and networked device 120 via network cable 140*b*. Port-specific circuitry 107 is operatively coupled to electrical transceiver module 104.

Port control 130 is configured to enforce a policy that places restrictions on a port of the networked device 120. The operation of port control 130 may be the same as or substantially similar to port control 110. The policy may be applied to optical transceivers of networked device 120. Specifically, the policy may maximize energy efficiency of one or more optical transceivers, for example, by modifying an operating state of the optical transceiver. Moreover, the policy may also be applied to maximize energy efficiency of port-specific circuitry.

In operation, one or both of networked devices 101 and 120 may be configured to support an energy efficiency policy. In one embodiment, where an energy savings mode (hereinafter, "green mode") is established, a laser transmitter of the optical transceiver is pulsed based on, in part, a receive loss of signal, indicating a presence or absence of a receive energy from a link partner. As used herein, a link partner is a peer networked device on an opposite end of the network cable. For example, port-specific circuitry 106 and optical transceiver module 103 of networked device 101 combined, act as a link partner to optical transceiver module 123 and port-specific circuitry 126 of networked device 120. It is well understood that the receive "loss of signal" (LOS) is asserted when the receive energy from the link partner is below a specified range or no link partner is attached. The LOS is de-asserted when the receive energy is above the specified range. In one embodiment, the receive energy is the energy transmitted from the link partner and received by the networked device.

In one embodiment, pulsing may include alternating between a "green active" phase (e.g., laser transmitter emits energy) and a "green inactive" phase (e.g., laser transmitter withholds emissions of energy). In the green active phase, the link partner may detect a burst of energy. In the green inactive phase, an optical transceiver module and/or a serializer/deserializer (SERDES) of a port-specific circuitry operatively coupled to the optical transceiver module are turned off.

As such, pulsing the laser transmitter disables the otherwise wasted transmission of energy while retaining the ability to establish a valid communication link with a link partner. Pulsing in the green mode provides energy savings over maintaining full energy transmission by the optical transceiver when there is no valid signal from the peer device.

Moreover, when the presence of a valid receive energy is detected from the link partner, the laser transmitter may be controlled to latch and remain in an active state such that a communication link is established and maintained. In one embodiment, two networked devices that are both implemented for energy efficient operation as described herein are connected together. Latching may be performed to avoid repeated toggling between establishing a link and disconnecting the link between these devices. In one embodiment, latching ensures that as soon as one networked device detects a valid receive energy and latches, the other networked device (i.e., link partner) will do so as well. In another embodiment, one networked device is implemented for energy efficient operation and the other is a traditional device (i.e., not implemented for energy efficient operation as described herein).

Since a laser transmitter in the traditional device would always be on, latching may not be necessary. Additionally, the active state may be identified to a central network management tool, for example to observe that the communication link is operational.

In general, devices, communication links, protocols, architectures, configurations, and other characteristics can vary from those illustrated herein. For example, other types of network architectures may also be employed. Further, other configurations of networked devices 101 and 120 may be used.

The present invention can also be applied in other network topologies and environments. Network system 100 may be any type of network familiar to those skilled in the art that can support data communications using any of a variety of commercially-available protocols, including without limitation TCP/IP, SNA, IPX, AppleTalk, and the like. Merely by way of example, network system 100 can be a local area network (LAN), such as an Ethernet network, a Token-Ring network and/or the like; a wide-area network; a logical network, including without limitation a logical private network (e.g., VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
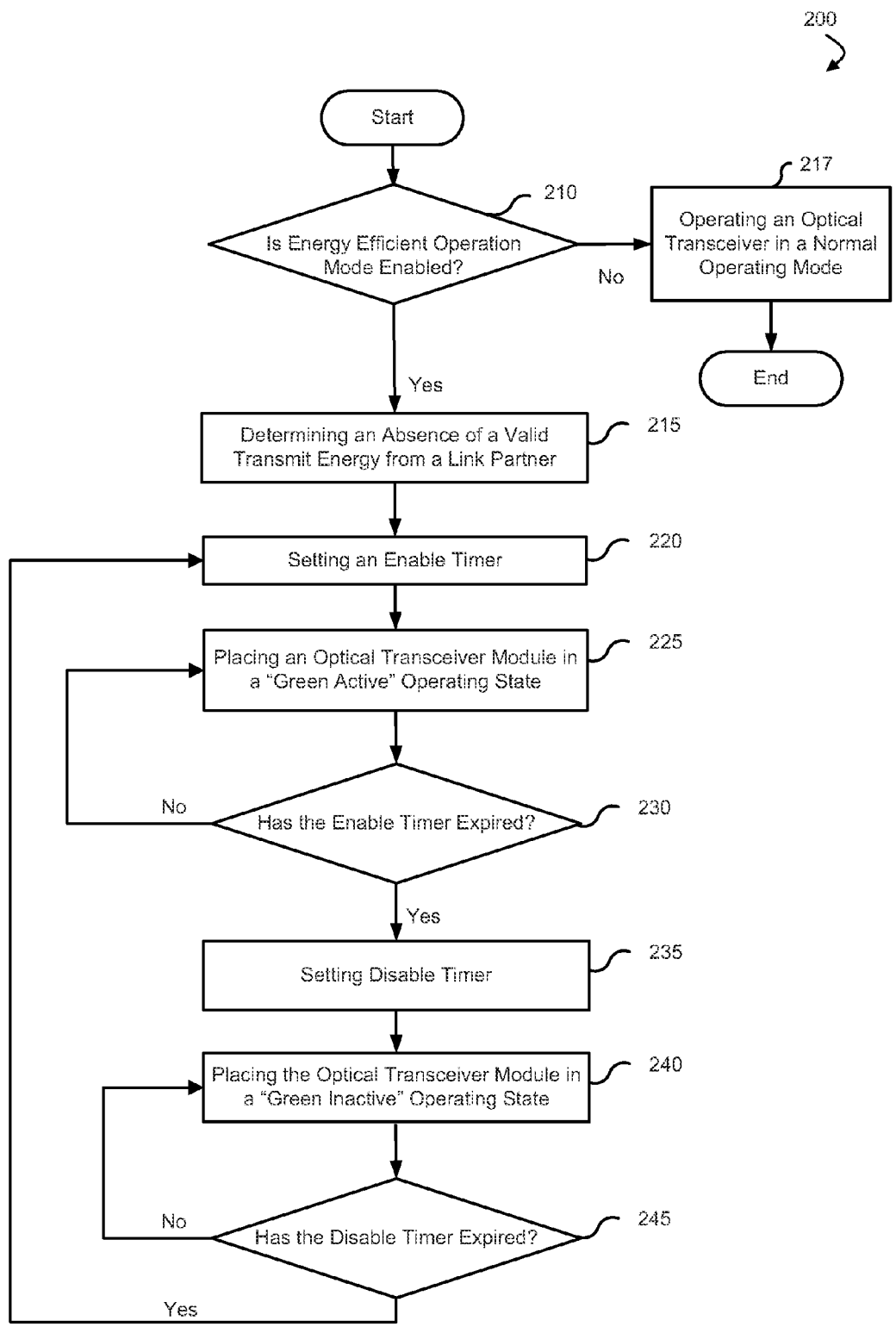
FIG. 2 is a process flow diagram for energy efficient operation of an optical transceiver in accordance with an embodiment of the invention.

FIG. 2 is a process flow diagram for energy efficient operation of an optical transceiver in accordance with an embodiment of the invention. The depicted process flow 200 may be carried out by execution of one or more sequences of executable instructions. In another embodiment, the process flow 200 is carried out by components of a networked device, an arrangement of hardware logic, etc. For example, one or more steps of process flow 200 may be performed by a port control module of a network device (e.g., switch, router, etc.), a server, end station, or other computer.

At step 210, it is determined whether an energy efficient operation mode is enabled for the port control module. In one embodiment, the operating modes of the port control module are configured, for example during initialization of the networked device. The operating modes may include an active mode, inactive mode, and an energy efficient mode (e.g., "green" mode). In one embodiment, the green mode is comprised of a "green active" operating mode and a "green inactive" operating mode.

Where it is determined that the energy efficient mode is not enabled, the optical transceiver is operated in a normal operating mode, at step 217. In one embodiment, the normal operating mode does not attempt to optimize the optical transceiver for energy efficiency. If a green mode is not enabled, the process flows to step 217, then ends.

At step 215, an absence of a valid receive energy from a link partner may be determined, for example, based on a receive loss of signal indication. In one embodiment, the receive loss of signal indication is received from an optical transceiver module. Upon determining the absence of the valid receive energy, a laser transmitter of the optical transceiver module may be pulsed in the green mode.

Pulsing may be performed by setting an enable timer, at step 220. The enable timer may be used to control the interval of time that a laser transmitter emits energy. The amount of time for the enable timer may be configurable. In one embodiment, the pulse "on" phase is short enough in duration to provide savings over having the port on 100% of the time and long enough to ensure that a receiver will detect energy.

At step 225, the optical transceiver module may be placed in a "green active" operating state. In the green active state, a transmit disable signal may be de-asserted. A transmit disable signal line may be provided to a port-specific circuitry (e.g., PHY) and/or the optical transceiver module. A de-asserted transmit disable signal causes the laser transmitter to emit energy. At step 230, it is determined whether the enable timer has expired. Where the enable timer has not expired, the transmit disable signal continues to be de-asserted.

Otherwise, the transmit disable signal is asserted, and a set disable timer is set at step 235. The disable timer may be used to control the amount of time that a laser transmitter withholds energy emissions. The amount of time for the disable timer may be configurable. At step 240, the optical transceiver module may be placed in a "green inactive" operating state. In the green inactive state, the transmit disable signal may be asserted. An asserted transmit disable signal causes the laser transmitter to withhold energy emissions. At step 245, it is determined whether the disable timer has expired. Where the disable timer has not expired, the transmit disable signal continues to be asserted. Where the disable timer has expired, processing may continue to step 220 where the enable timer is set.

At one or more of steps 220-245, pulsing in the energy efficient mode may come to an end. For example, where a valid receive energy from the link partner is determined, pulsing may not be performed.

Figure 3:
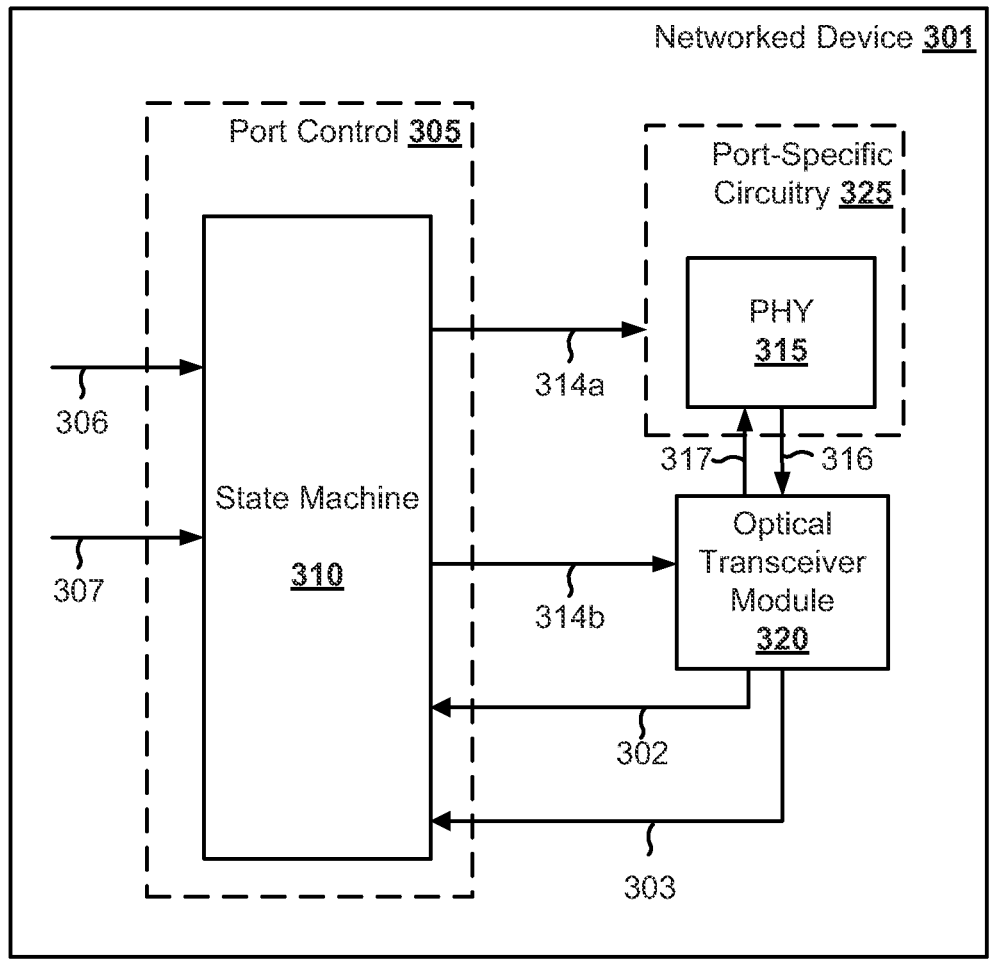
FIG. 3 is block diagram of a networked device enabled for energy efficient operation of an optical transceiver module in accordance with an embodiment of the invention.

FIG. 3 is block diagram of a networked device 301 enabled for energy efficient operation of an optical transceiver module in accordance with an embodiment of the invention. Networked device 301 may be a network device such as a switch or router, a server, end station, or other computer. As shown, networked device includes a port control circuitry 305, a port-specific circuitry 325, and an optical transceiver module 320.

Port control 305 is configured to enforce a policy to maximize energy efficiency of one or more optical transceivers and/or to maximize energy efficiency of port-specific circuitry. Port control 305 is operatively coupled to port-specific circuitry 325 via a control signal line 314a. PHY 315 may be included within port-specific circuitry 325. Control signal line 314a establishes the operating state of PHY 315 and/or other elements of port-specific circuitry 325. Port control 305 is operatively coupled to optical transceiver module 320 via control signal line 314b. Control signal line 314b establishes the operating state of the laser transmitter of optical transceiver module 320. In one embodiment, control signal line 314a and control signal line 314b behave the same. For example, control signal line 314a and control signal line 314b may be two branches of a transmit disable signal. In this embodiment, where the transmit disable signal line is asserted, PHY 315, other components of port-specific circuitry 325, and/or the laser transmitter are disabled or are otherwise not consuming power. On the other hand, where the transmit disable signal line is de-asserted, PHY 315, other components of port-specific circuitry 325, and/or the laser transmitter PHY 315 are enabled. As such, the laser transmitter is controlled by or is otherwise responsive to the transmit disable signal line.

In another embodiment, control signal line 314a and control signal line 314b behave independently. For example, control signal line 314b may be a transmit disable signal line which may be pulsed, whereas control signal line 314a may be a port-specific control disable signal (PSC_DIS) which would be either on or off.

In one embodiment, state machine 310 is a model of an energy efficiency policy. State machine 310 may be configured to specify one or more conditions under which an operating state of the port control 305 is modified. The state of the port control affects the manner in which an optical transceiver or a link associated with the optical transceiver is operated. Moreover, the state of the port control may affect the operating state of PHY 315 and/or other components of port-specific circuitry 325. A clock signal line 306 and a reset signal line 307 may feed into state machine 310. A data signal line 316 from PHY 315 to optical transceiver module 320 may be included. A data signal line 317 from optical transceiver module 320 to PHY 315 also may be included.

PHY device 315 is configured to act as the physical interface that enables communication, for example transmission and reception of data between networked device 301 and optical transceiver module 320.

Optical transceiver module 320 may be a pluggable transceiver module or may be integrated within the networked device 301 and may be configured to support, for example, Ethernet communications over optical fiber. Optical transceiver module 320 may be further configured to perform link discovery, for example, by detecting active operations in a link partner via an optical fibercoupled thereto. Optical transceiver module 320 may include various optical and electrical components (not shown) that may be configured to provide an interface between the networked device 301 and a link partner at the opposite end of an optical fiber cable. Optical transceiver module 320 may include a laser transmitter (not shown) which is configured to emit optical energy. In one embodiment, optical transceiver module 320 is operatively coupled to state machine 310 via a receive loss of signal line 302 and a module absent signal line 303.

One or more optical transceivers such as optical transceiver module 320 may be configured to operate in a green mode (i.e., energy efficient mode). For example, during an initial configuration of the networked device, a green mode may be established for port control 305. In operation, optical transceiver module 320 may detect the physical presence of a module, such as a fiber-optic cable connector, in a receptacle of the transceiver module. As such, the module absent signal line 303 may be de-asserted. Optical transceiver module 320 may further detect that a receive energy on the optical fiber cable from the link partner is below a specified range. As such, receive loss of signal line 302 may be asserted.

The laser transmitter of optical transceiver module 320 may be pulsed based on, in part, receive loss of signal line 302. In one embodiment, port control 305 may control the laser transmitter, causing it to pulse, by asserting or de-asserting the transmit disable signal line as determined by state machine 310. In particular, optical transceiver module 320 may be placed in a "green active" phase, causing the laser transmitter to emit energy, for a period of time, by disabling the transmit disable signal line. Optical transceiver module 320 may placed in a "green inactive" phase, causing the laser transmitter to withhold transmission of energy, for a period of time by asserting the transmit disable signal line. Pulsing of the laser may be accomplished by alternating between the green active phase and the green inactive phase, for example, as determined by state machine 310.

Operating State

Figure 4:
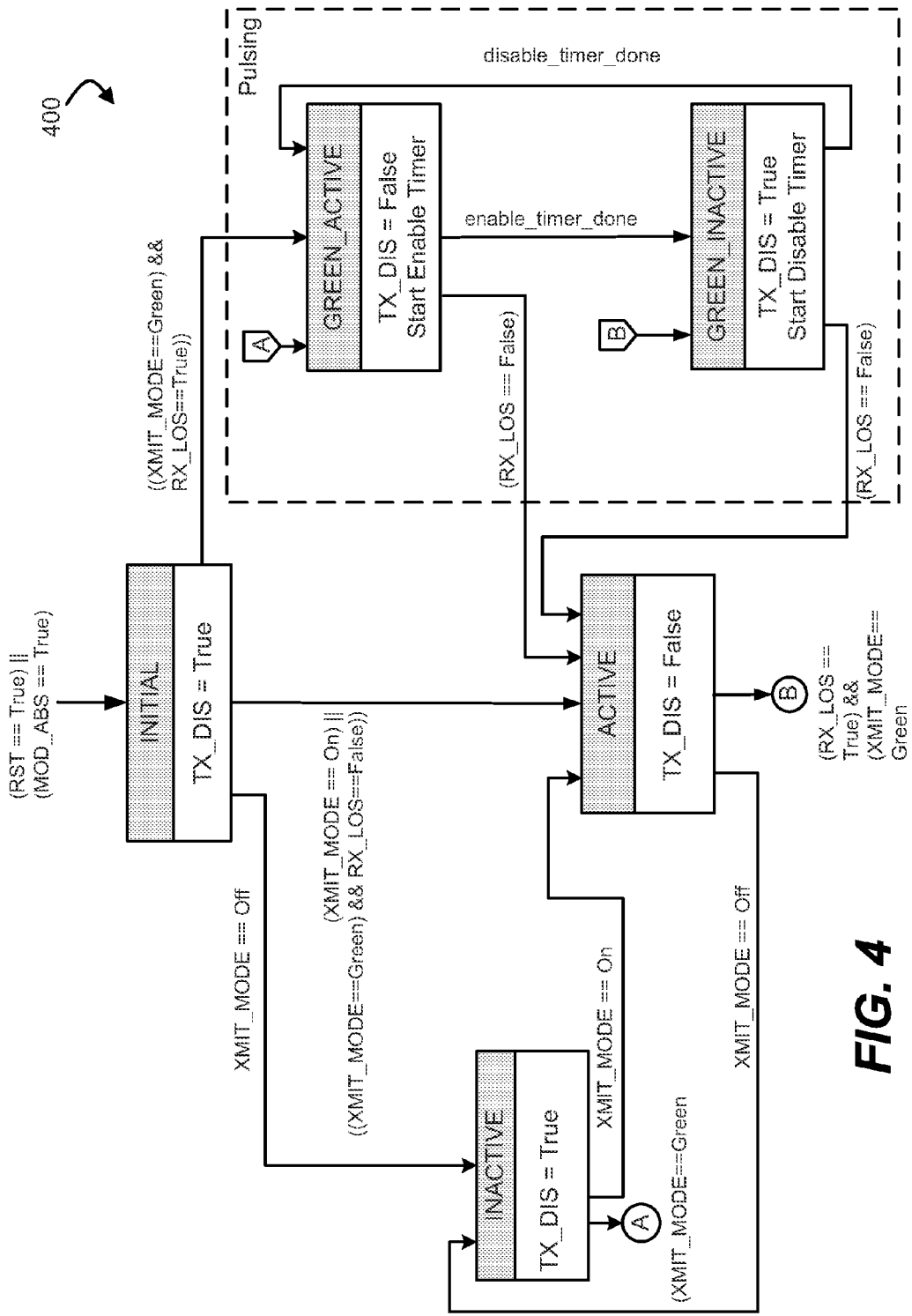
FIG. 4 is a state diagram for energy efficient operation of an optical transceiver in accordance with an embodiment of the invention.

FIG. 4 is a state diagram for energy efficient operation of an optical transceiver in accordance with an embodiment of the invention.

As described herein, an optical transceiver of a networked device may be configured for optimal energy efficiency. The state of the port control affects the manner in which an optical transceiver or a link associated with the optical transceiver is operated.

In one embodiment, a XMIT_MODE variable is an enumerated type that establishes the operating mode of a state machine of the port control module. Valid enumerated types may include On, Off, and Green. The state machine may be continuously operational. RX_LOS is a Boolean variable that indicates the presence (i.e., FALSE) or absence (i.e., TRUE) of received energy from a link partner. A transmit disable variable (TX_DIS) is a Boolean that establishes the operating state of a laser transmitter of the optical transceiver. A module absent variable (MOD_ABS) is a Boolean that indicates the physical presence (FALSE) or absence (TRUE) of a module, such as a fiber-optic cable connector, in the receptacle of the optical transceiver. A reset variable (RST) is a Boolean that indicates a state machine reset condition.

Various timers may be employed by the state machine, such as a disable timer and an enable timer. A disable_timer_done variable is a Boolean that is set to TRUE when the disable timer interval is complete. An enable_timer_done variable is a Boolean that is set to TRUE when the enable timer interval is complete.

Optical transceivers may be controlled according to five operating states of a port control: an initial operating state, an active operating state, an inactive operating state, a green active operating state, and a green inactive operating state.

In the initial operating state, the port control of a networked device is initialized, for example, as the networked device is first engaged (e.g., powered-on), a reset function is engaged, or as no physical presence of a module is detected in a receptacle of an optical transceiver (e.g., MOD_ABS is detected to be TRUE). In the initial operating state, a transmit disable variable (i.e., TX_DIS) is asserted and provided, for example from a port control of the networked device to a PHY and/or the optical transceiver, and as such, the laser transmitter of the optical transceiver does not emit energy.

An energy savings mode (i.e., green mode) may be established for an optical transceiver and may be accomplished by pulsing a laser transmitter in the optical transceiver. Pulsing may be accomplished by alternating between the green active operating state and the green inactive operating state.

In the green active operating state, an enable timer is started and the transmit disable signal is de-asserted and provided, for example from the port control to a PHY and/or the optical transceiver. In response to the de-assertion of the transmit disable signal, the laser transmitter emits energy. The transmit disable signal may continue to be de-asserted as long as the enable timer has not expired.

In the green inactive operating state, a disable timer may be started and the transmit disable signal is asserted and provided, for example from the port control to a PHY and/or the optical transceiver. In response to assertion of the transmit disable signal, the laser transmitter withholds emissions of energy. The transmit disable signal may continue to be asserted as long as the disable timer has not expired.

In the active operating state, the transmit disable signal is de-asserted. In response, the laser transmitter emits energy. In the inactive operating state, the transmit disable signal is asserted, and in response, the laser transmitter withholds the emission of energy.

The port control module may transition from state to state based on an expiration of timers, a change in configuration of operating modes for the optical transceiver, and/or a change in the receive loss of signal (i.e., RX_LOS).

A state change from the initial operating state to the inactive operating state may take place where the XMIT_MODE is set to an Off enumerated type.

A state change from the initial operating state to the active operating state may take place where XMIT_MODE is set to an On enumerated type. Moreover, a state change from the initial operating state to the active operating state may take place where the XMIT_MODE is set to a Green enumerated type and the RX_LOS is de-asserted. Such a state change may occur, for example, where the optical transceiver may be controlled to latch after detecting the presence of a valid receive energy from the link partner.

A state change from the initial operating state to the green active operating state may take place where the XMIT_MODE is set to a Green enumerated type and RX_LOS is asserted (e.g., indicating an absence of a valid receive energy from the link partner).

A state change from the green active operating state to the green inactive operating state may take place where the enable_timer_done variable is set to True. For example, the enable timer may be used to control the interval of time that a laser transmitter emits energy. When the enable timer interval has expired, the state change may occur.

A state change from the green active operating state to the active operating state may take place where the RX_LOS is False, e.g., indicating a presence of a valid receive energy from the link partner. As such, the optical transceiver may be controlled to latch after detecting the presence of a valid receive energy from the link partner.

A state change from the green inactive operating state to the green active operating state may take place where the disable_timer_done variable is set to True. For example, the disable timer may be used to control the interval of time that a laser transmitter withholds the emission of energy. When the disable timer interval has expired, the state change may occur.

As such, alternating between the green active operating state and the green inactive operating state may produce pulsing in the laser transmitter of the optical transceiver. As previously described, pulsing reduces energy consumption by the optical transceiver when there is no valid signal from the peer device.

A state change from the green inactive operating state to the active operating state may take place where the RX_LOS is False, e.g., indicating a presence of a valid receive energy from the link partner. As such, the transmit disable may be latched off after detecting the presence of a valid receive energy from the link partner.

A state change from the inactive operating state to the active operating state may take place where the XMIT_MODE is modified or otherwise set to an On enumerated type. A state change from the inactive operating state to the green active operating state may take place where the XMIT_MODE is modified or otherwise set to a Green enumerated type. In such a state transition, the laser transmitter may be controlled to pulse in the green mode.

A state change from the active operating state to the inactive operating state may take place where the XMIT_MODE is modified or otherwise set to an Off enumerated type. A state change from the active operating state to the green inactive operating state may take place where the RX_LOS is True (e.g., indicating absence of a valid receive energy from the link partner) and the XMIT_MODE is modified or otherwise set to a Green enumerated type. In such a state transition, the laser transmitter may be controlled to pulse when RX_LOS is True. In one embodiment, the state transition to the green inactive state may take place after the RX_LOS is detected to be True for a minimum period of time. For example, the time period may be longer than the amount of time specified by the disable timer. By waiting for the RX_LOS True value to hold for the time period, transitions performed based on erroneous signal values may be reduced or avoided altogether.

In other embodiments, one or more components of the networked device (e.g., server, switch, etc.) can be put in the inactive or green inactive operating states. For example, PHY components and/or portions of an optical transceiver such as a laser transmitter may be powered-down, disabled, or otherwise withheld from consuming energy.

In one embodiment, a control signal for a port-specific circuitry (e.g., PSC_DIS) may behave differently from a control signal for a laser transmitter (e.g., TX_DIS). Where PSC_DIS is asserted, one or more components of a port-specific circuitry are powered-down, disabled, or otherwise withheld from consuming energy. Where PSC_DIS is de-asserted, one or more components of a port-specific circuitry are turned on. PSC_DIS may be asserted in the green active operating state and green inactive operating state. PSC_DIS may be de-asserted in the active operating state.

Figure 5:
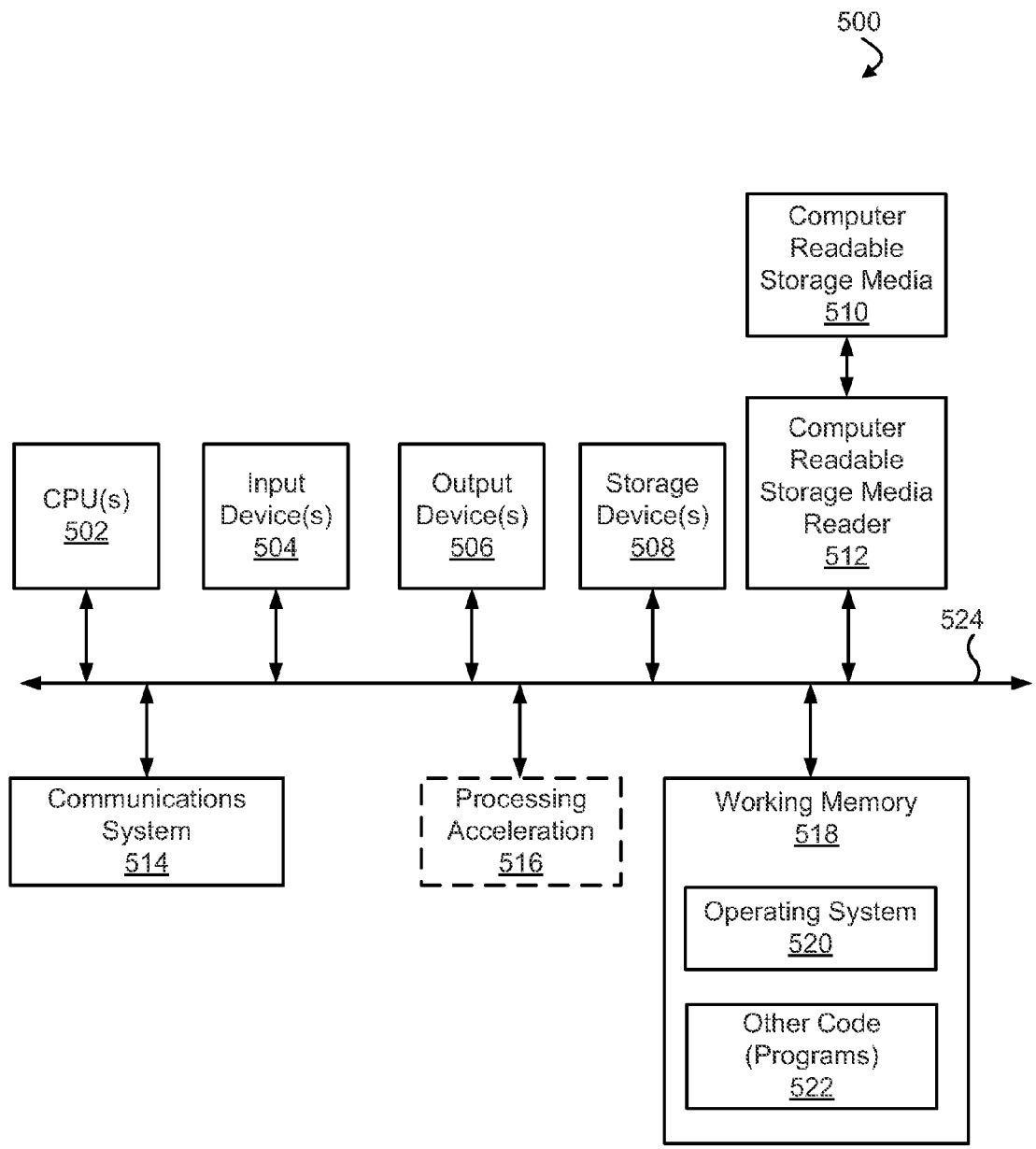
FIG. 5 illustrates an exemplary computer system in which various embodiments of the present invention may be implemented.

FIG. 5 illustrates an exemplary computer system 500 in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and in combination with storage device(s) 508 in one embodiment) comprehensively representing remote, local, fixed, and/or removable storage devices plus storage media for temporarily and/or more permanently containing, storing, transmitting, and retrieving computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method of operating an optical transceiver of a networked device in an energy efficient mode, the method comprising:
   determining whether a port control of the networked device is enabled to operate the optical transceiver in an energy efficient mode or a normal mode;
   in response to a determination that the port control is enabled to operate the optical transceiver in the energy efficient mode, determining whether there is an absence of a valid receive energy from a link partner; and
   in response to a determination that there is an absence of the valid receive energy from a link partner, continuously pulsing a transmitter of the optical transceiver by asserting and de-asserting a control signal by,
   setting an enable timer;
   de-asserting the control signal until the expiration of the enable timer;
   setting a disable timer; and
   asserting the control signal until the expiration of the disable timer.

2. The method of claim 1, further comprising:
   de-asserting the control signal in response to a determination of the presence of the valid receive energy from a link partner prior to expiration of the enable timer; and
   establishing a communication link with a link partner via the optical transceiver.

3. The method of claim 1, further comprising:
   asserting a second control signal; and
   disabling a port-specific circuitry in response to the second control signal.

4. The method of claim 1, wherein in response to a determination that the optical transceiver is not enabled to operate in the energy efficient mode, and a determination of an absence of the valid receive energy from a link partner, the method further comprising,
   asserting the control signal; and
   upon a subsequent determination that the port control is enabled to operate in the energy efficient mode, and that the valid receive energy remains absent, continuously pulsing the transmitter by asserting and de-asserting the control signal.

5. A networked device for energy efficient operation of an optical transceiver of the networked device, the networked device comprising:
   an optical transceiver having an energy efficient mode and a normal mode;
   a port control module to operate the optical transceiver in the energy efficient mode, the port control module coupled to the optical transceiver; and
   port-specific circuitry coupled to the port control module and the optical transceiver,
   wherein upon a determination that the optical transceiver is to be operated in the energy efficient mode, the port control module is to:
   determine an absence of a valid receive energy from a link partner; and
   continuously pulse a transmitter of the optical transceiver through assertion and de-assertion of a control signal, and wherein an enable timer is set, the control signal is de-asserted until expiration of the enable timer, a disable timer is set, and the control signal is asserted until expiration of the disable timer to assert and de-assert the control signal.

6. The networked device of claim 5, wherein the port control module is further to, in response to a determination of a presence of a valid receive energy from a link partner, de-assert the control signal prior to expiration of the enable timer, and
   establish a communication link with a link partner via the optical transceiver.

7. A non-transitory computer-readable storage medium storing a plurality of instructions that when executed by a processor cause the processor to implement a method for energy efficient operation of an optical transceiver of a networked device, the plurality of instructions comprising code to cause the processor to:
   determine whether a port control of the networked device is enabled to operate the optical transceiver in an energy efficient mode or a normal mode;
   determine whether there is an absence of a valid receive energy from a link partner; and
   in response to a determination that the port control is enabled to operate the optical transceiver in the energy efficient mode and a determination that there is an absence of the valid receive energy from a link partner, continuously pulse a transmitter of the optical transceiver through assertion and de-assertion of a control signal, until either a determination of a presence of the valid receive energy or a determination that the port control is not enabled to operate the optical transceiver in the energy efficient mode,
   wherein to assert and de-assert the control signal, an enable timer is set, the control signal is de-asserted until expiration of the enable timer, a disable timer is set, and the control signal is asserted until expiration of the disable timer.

8. The non-transitory computer-readable storage medium of claim 7 wherein the plurality of instructions further comprise code to cause the processor to:
   determine a presence of a valid receive energy from a link partner;
   de-assert the control signal prior to expiration of the enable timer; and
   establish a communication link with a link partner via the optical transceiver.

9. The non-transitory computer-readable storage medium of claim 7 wherein the absence of the valid receive energy from the link partner exceeds a minimum period of time.

10. The non-transitory computer-readable storage medium of claim 7, wherein in response to a determination that the optical transceiver is not enabled to operate in the energy efficient mode, and in response to a determination of an absence of valid receive energy, the code is further to cause the processor to:
    assert the control signal; and
    upon a subsequent determination that the optical transceiver is enabled to operate in the energy efficient mode, the code is to pulse the transmitter through assertion and de-assertion of the control signal.

11. The non-transitory computer-readable storage medium of claim 7 wherein upon a determination of a presence of valid receive energy from a link partner, the plurality of instructions further comprise code to cause the processor to de-assert the control signal prior to expiration of the enable timer.

* * * * *